(12) United States Patent
Kubitz

(10) Patent No.: US 7,447,660 B2
(45) Date of Patent: Nov. 4, 2008

(54) SYSTEM AND METHOD FOR CAPACITY TESTING OF ELECTRONIC FUNDS TRANSFER SYSTEMS

(75) Inventor: Carl Kubitz, Scottsdale, AZ (US)

(73) Assignee: Lexcel Solutions, Inc., Scottsdale, AZ (US)

( * ) Notice: Subject to any disclaimer, the term of this patent is extended or adjusted under 35 U.S.C. 154(b) by 1111 days.

(21) Appl. No.: 10/428,327

(22) Filed: Apr. 30, 2003

(65) Prior Publication Data

US 2004/0220875 A1 Nov. 4, 2004

(51) Int. Cl.
*G06Q 40/00* (2006.01)
(52) U.S. Cl. .......................... 705/39; 705/35
(58) Field of Classification Search ............. 705/30–43, 705/10, 100; 707/10, 100
See application file for complete search history.

(56) References Cited

U.S. PATENT DOCUMENTS

| | | | | |
|---|---|---|---|---|
| 4,625,276 A | * | 11/1986 | Benton et al. | 705/44 |
| 7,028,185 B2 | * | 4/2006 | Wheeler et al. | 713/170 |
| 2002/0097715 A1 | * | 7/2002 | Roerick | 370/389 |
| 2003/0115463 A1 | * | 6/2003 | Wheeler et al. | 713/170 |

* cited by examiner

*Primary Examiner*—Frantzy Poinvil
(74) *Attorney, Agent, or Firm*—Bryan Cave LLP

(57) ABSTRACT

The system of the invention provides for testing of Electronic Funds Transfer host systems. A first personal computer is used to generate test scripts. The test scripts are downloaded to a number of second personal computers that are operated under control of the first processor to provide EFT test messages to the host system. The number of the second personal computers is selected to provide a maximum rate of providing test transactions to the host. Data collection is utilized to permit the first processor to display the host system response time to varying loads or transaction rates.

38 Claims, 7 Drawing Sheets

SYSTEM AND METHOD FOR CAPACITY TESTING OF ELECTRONIC FUNDS TRANSFER SYSTEMS

FIELD OF THE INVENTION

The invention pertains to Electronic Funds Transfer systems, in general, and to a system and method for the testing of EFT systems to handle varying volumes and types of transactions, in particular.

BACKGROUND OF THE INVENTION

In today's competitive environment, credit and debit card-holding customers are using their cards to access financial services from more remote locations via a multitude of external network providers. To better compete, financial issuers, acquirers, and processors alike are looking for newer, more cost effective means to bypass middle players and directly connect to more networks.

Traditionally the Electronic Funds Transfer ("EFT") arena is restricted to mainframe processing systems and software, creating substantial cost entry barriers to smaller entities that would otherwise have significant need to process financial transactions. This forces these smaller entities to outsource their EFT transaction operations to third party vendors who are more expensive per transaction.

To provide superior service levels and to maintain data processing integrity, organizations must plan for and test the complete range of operational extremes. Many times, weaknesses in application software or hardware systems only surface under extreme operating conditions.

It is highly desirable to provide a means for testing the capacity of EFT systems by testing the ability of the EFT system to handle volumes of electronic funds transactions representative of expected transactions both in terms of the quantities of such transactions and the various types of such transactions.

SUMMARY OF THE INVENTION

A system in accordance with the invention provides a capability to perform "mission critical" EFT system stress tests, providing mapping of system capacity that can be critical to ensure non-stop processing of customer transactions The system in accordance with the invention acts as an accelerator to drive transactions in a rapid-fire progression of validation messages in specified formats into a Host system. The system of the invention is a capacity planning system, measuring host responses in a full-load stressed environment.

The illustrative embodiment of a system in accordance with the invention determines response time of the host system to specific transaction arrival rates as well as the identification of maximum arrival rates and queue depths before operational degradation of the host. Specific response times may be determined for any given transaction. Maximum transaction rates are determined over a sustained period for specific application/communication line configurations as well as for the total host system.

In the illustrative embodiment of the invention, a user can create scripts by either "drag and drop" script creation using default message data; or by translating historic log files of a Host system into test scripts following a filtering process to remove confidential or non-essential data including PAN, PIN and date stamp information. In both cases, the logic "personality" is automatically incorporated into ISO, ATM & POS message formats to ensure the most precise simulation.

In accordance with the invention an accelerated LAN connectivity (ALC) environment is utilized to take advantage of higher rates of data transfer possible in a LAN environment, forcing abundant transactions through a single host processor port, or through multiple host processor ports.

A system configuration in accordance with the invention maximizes the rate of message throughput the host system port(s) while allowing for a minimal investment in PC hardware. True transaction rates of in the range of at least 2000 transactions per second (TPS) are achievable with the system configuration of the illustrative embodiment. The system configuration more precisely replicates the production environment of the host system by distributing transactions throughout multiple host ports, providing a more realistic stress test of the actual host system production environment.

The system of the invention provides logging and reporting capabilities specifically designed for in-depth post-test analysis. A trace file is created for all transactions and responses for further post-test analysis and review. Test session results are exportable for customer report generation.

A system for testing of an electronic funds transfer (EFT) host system in accordance with the principles of the invention includes a test administration and data generation first processor that is operable to generate predetermined scripts of EFT test messages for the host system. The system of the invention further includes a predetermined number of second processors, each coupled to the first processor and each having one or more communication links to the host system. Each second processor receives a selected script of EFT test messages from the first processor. The predetermined number of second processors is determined by a maximum transactions rate of the system. The first processor controls operation of each second processor to cause each second processor to communicate corresponding test messages to the host system at corresponding transaction rates determined by the first processor.

Data generation and gathering software is provided at each second processor for determining response time of the host system to receipt and processing of the EFT test messages.

Data collection and processing software is provided at the first processor. The first processor is operable in accordance with the data collection and processing software to obtain response time data from each of the second processors. The first processor is operable to generate a data record of response time of the host system to the EFT test messages.

The system includes a control panel coupled to the first processor. The control panel is usable to control the second processors to determine the rate of test messages provided to the host system. In the illustrative embodiment of the invention the control panel is an electronic display produced by the first processor.

The display is operable to provide graphical images of the response time of the host system to EFT test messages. The display is also operable to display the rate of test messages provided to the host system.

In the illustrative embodiment, the first and second processors are personal computers.

Further in accordance with the invention one or more third processors are coupled to the host system by one or more communication links to receive requests from the host system in response to certain ones of the test messages and to provide predetermined responses to the host for each test message. Data generation and gathering software is provided at each of the second processors for determining response time of the host system to receipt and processing of the EFT test messages and predetermined responses.

The data collection and processing software at the first processor is further used by the first processor to obtain response time data from each of the third processors.

A method for testing of an electronic funds transfer (EFT) host system, comprises the steps of: providing a test administration and data generation first processor; operating the first processor to generate predetermined scripts of EFT test messages for the host system; providing a predetermined number of second processors; coupling each second processor coupled to the first processor; coupling each second processor via one or more communication links to the host system; generating at the first processor selected scripts of EFT test messages; transmitting to each second processor selected ones of the script of the EFT test messages from the first processor; determining the predetermined number of second processors by a desired maximum transactions rate to be applied to the host system; and operating the first processor to control operation of each of the second processors to cause each to communicate corresponding test messages to the host system at corresponding transaction rates determined by the first processor.

The method may also include providing data generation and gathering software at each of the second processors for determining response time of the host system to receipt and processing of EFT test messages.

The method may also include providing data collection and processing software at the first processor; operating the first processor in accordance with the data collection and processing software to obtain response time data from each of the second processors; and utilizing the first processor to generate a data record of response time of the host system to the EFT test messages.

The method may further include providing a control panel coupled to the first processor; and using the control panel to control the second processors to determine the rate of the test messages provided to the host system. The method may also include providing the control panel as an image on an electronic display produced by the first processor. The method also includes operating the display and the processor to provide graphical images of the response time of the host system to the test messages and/or operating the display and the processor to display the rate of test messages provided to the host system.

The method of the invention may also include providing one or more third processors; coupling each of the one or more third processors to the host system by one or more communication links; utilizing each of said one or more third processors for receiving requests from the host system in response to certain ones of the test messages and for providing predetermined responses to the host for each test message.

BRIEF DESCRIPTION OF THE DRAWING

The invention will be better understood from a reading of the following detailed description of an illustrative embodiment of the invention in conjunction with the drawing figures in which like reference designators are used to identify like elements, and in which.

DETAILED DESCRIPTION

Figure 1:
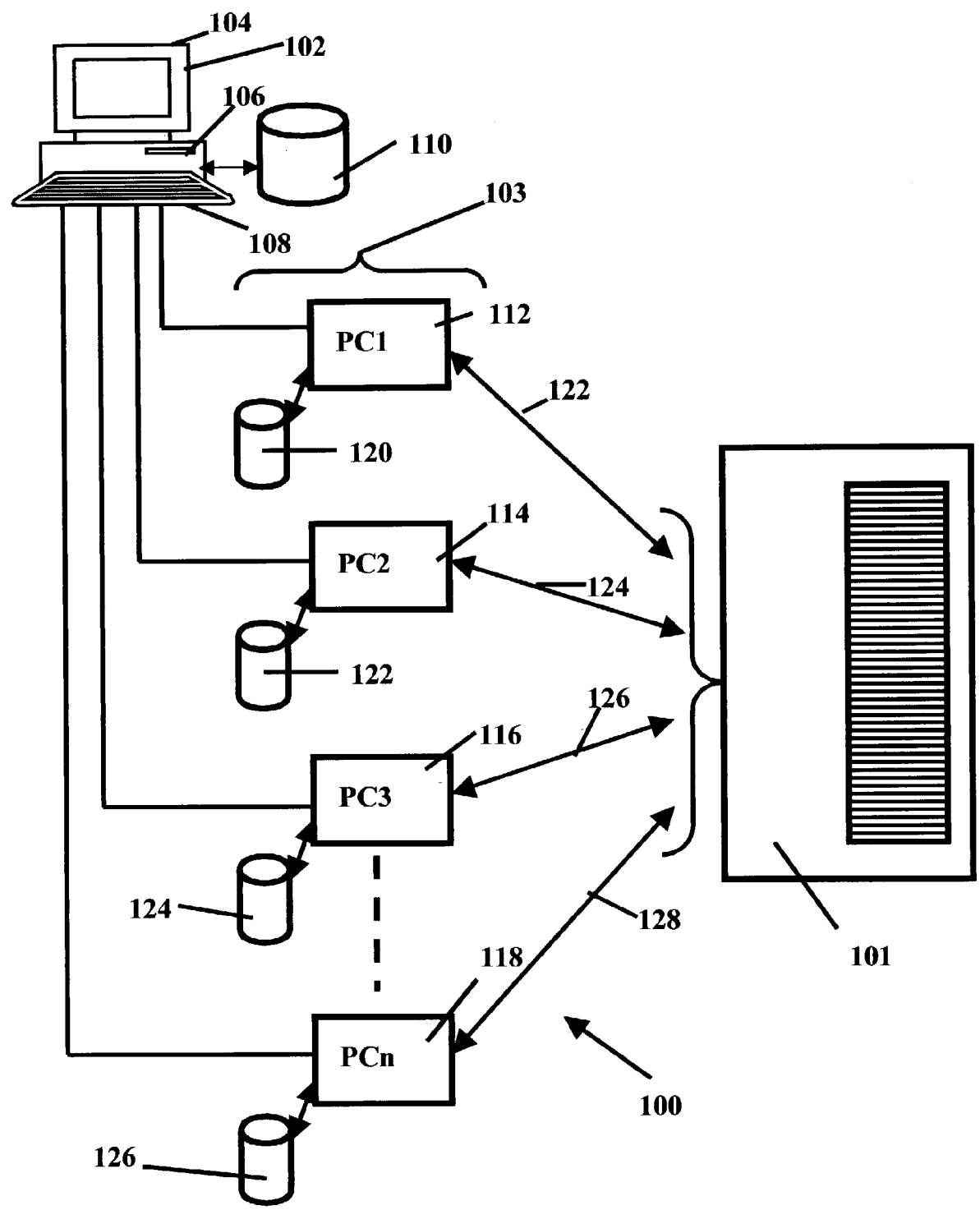
FIG. 1 is block diagram of a system in accordance with the principles of the invention.

Turning to FIG. 1, system 100 of the invention is shown in block form. System 100 is a powerful desktop testing tool designed for users to perform system stress testing and capacity analysis on their financial test and production systems.

System 100 enables users to determine overall financial system capacity of a financial system 101 by measuring transactions per second (TPS), response time in milliseconds and sustainable peak loads. System 100 creates an accelerated, rapid-fire progression of production-type request transactions, while also emulating approved and declined responses, all within an accelerated transaction rate environment benchmarked at over 2,000 TPS for the illustrative embodiment.

System 100 provides logging and reporting capabilities specifically designed for in-depth post-test analysis. The result is a fully loaded capacity-testing system using validated messages from specified ISO, ANSI, ATM or POS formats.

System 100 performs several measurement and mapping features. System 100 measures and maps response time at specific arrival rates. System 100 also measures and maps maximum sustainable arrival rates before degradation of System 101 and maximum sustainable queue depths before system degradation. For any given transaction the system can measure specific response times. Maximum transaction rates can be measured and mapped over a sustained period for specific applications/line configurations and/or the total financial system.

System 100 includes what is referred to as a time measuring component that enables users to map financial system processing response times to the millisecond at various intervals along a transaction life cycle. Transactions are traced at all points from their point of origin and back, the time measuring component measures and maps transaction interaction and intra-action latencies. This enables users to determine precisely when and where transactions entered and existed their financial system as well as each of the specific applications and hardware platforms within their financial system. The results of the time measuring component are available for off-loading to other applications for further analysis.

System 100 includes the capability to perform critical communications testing scenarios over a multitude of communications protocols. This communications-testing component is essential for determining the validity, integrity and reliability of message transmission. System 100 acts as a testing utility to streamline difficult (if not otherwise impossible) communications testing scenarios for telecommunications, Internet connections and LAN systems associated with the financial system of interest to test the quality and integrity of message and data transmission circuits.

System 100 of the illustrative embodiment comprises a test administration and data generator or first computer 102, comprising a processor unit 106, a display 104, a data entry device such as a keyboard 108 and associated memory 110. Computer 102 may be any one of a number of commercially available computers and may be a personal computer such as a desktop type computer with associated keyboard and display either of which may be any one of a number of commercially available units. Computer 102 may also be a laptop or notebook computer of a type that is commercially available. Computer 102 in the illustrative embodiment utilizes a microprocessor in the Pentium™ family available from the Intel Corporation. Computer 102 utilizes an operating system that is also commercially available, and in the illustrative embodiment the operating system is either Microsoft Windows 2000, or Microsoft NT 4.0.

Coupled to test administration and data generator computer 102 are one or more data generator or second computers 103. The number, "n", of data generator computers 103 is determined by the maximum rate at which EFT test messages are to be provided to host system 101. Although four data generator computers 112, 114, 116, 118 are shown, the actual number is determined by the EFT rate to be imposed upon host system 101. Each data generator computer 103 may be a commercially available personal computer in any available packaging configuration such as a desktop or laptop configuration. Associated with each data generator computer 112, 114, 116, 118 is a corresponding memory 120, 122, 124, 126. The memories 112, 114, 116, 118 may be any commercially memory suitable for use with the corresponding data generator computers 103. Data generator computers 112, 114, 116, 118 are coupled to host system 101 via corresponding communication links 122, 124, 126, 128. Communication links 122, 124, 126, 128 are selected to be compatible with whatever communications links are representative of the types of links that host system 101 typically uses. For example, each data generator computer 112, 114, 116, 118 is compatible with SNA, BiSync, TCP/IP and X.25 communication formats.

Prior to testing of host system 101, a customer transaction log is stored in memory 110. Processor 106 employs a filter to block confidential information from the transaction logs and to generate a script file that is loaded into memory 110. The script file is a mixture of different types of EFT requests.

Processor 106 downloads scripts from memory 110 to the data generator memories 120, 122, 124, 126.

The flexible and configurable platform architecture of System 100 enables users to perform a wide variety of accelerated volume and stress testing activities. The configuration of System 100 can be modified to suite almost any testing environment.

Display 104 and keyboard 108 serve as the primary user Interface for stress testing of host system 101 when using system 100. They provides the connectivity bridge between the other testing components of system 100 and the user's Host system 101, and enable a user to configure and define the message input formats and transaction exchange rates, and report the status and response times being recorded.

Figure 2:
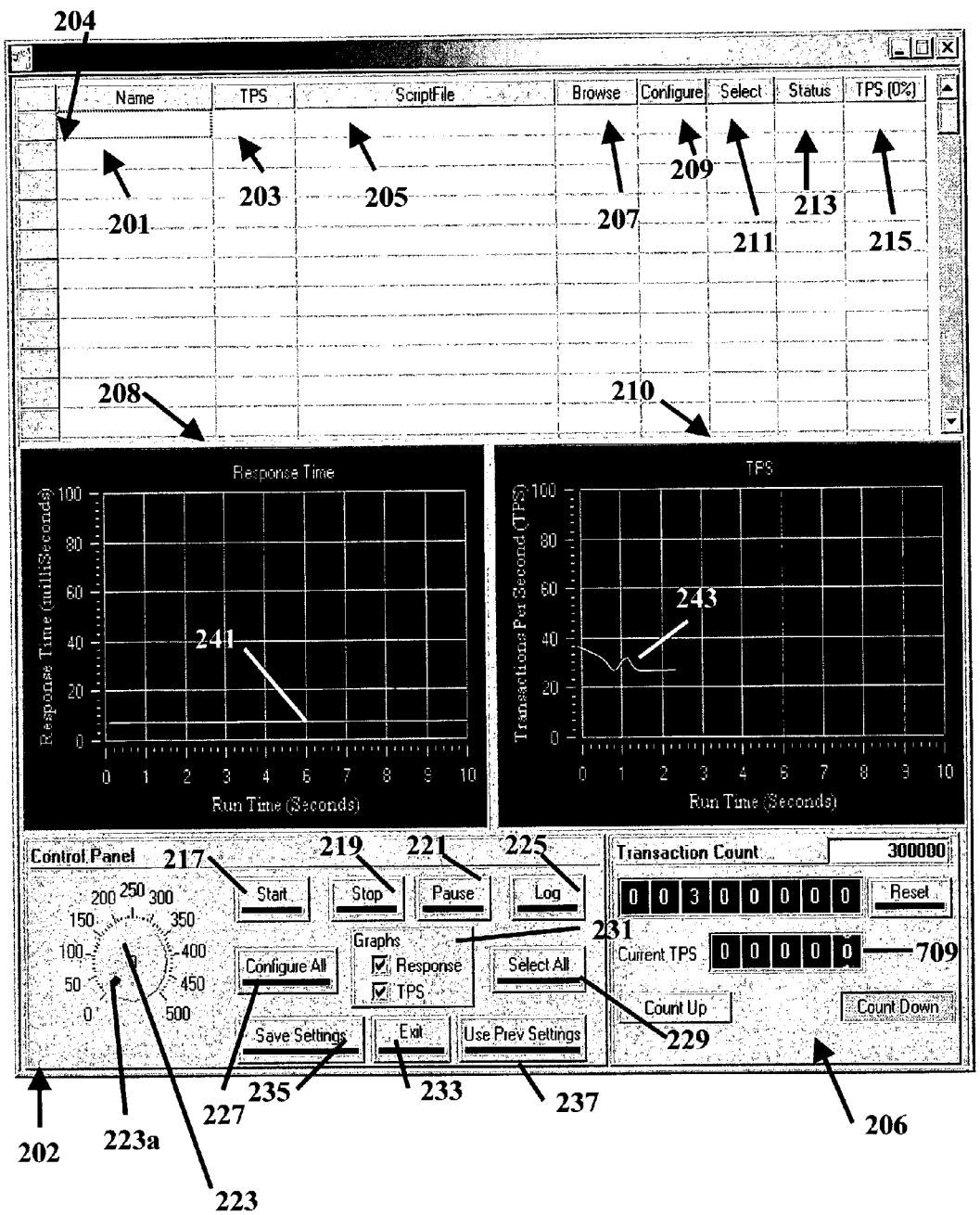
FIG. 2 is an image on a display.

FIG. 2 illustrates the image 200 displayed on display 104. The screen display is arranged as a control consol portion 202 and a display portion 204 and includes various controls including configuration controls.

Keyboard 108 is used to enter selective information into the fields shown in the upper portion of image 200. A message format name entered in Name field 201. Name field 201 is a read-only field.

A TPS (Transactions Per Second) field 203 may be set to a desired value from 1 to a maximum value. This value is established by either typing via the keyboard or by selecting the value using the up and down arrow keys.

A user can configure an individual script file in field 205 for each message format selected. This provides a transaction set of varying messages to create real-life message exchanges. The drive, directory and file name can be free-keyed by the user to identify the desired script file. An example of what could be keyed is as follows: C:\Program Files\Standard ISO\Scripts\UAT Script.txn.

Figure 3:
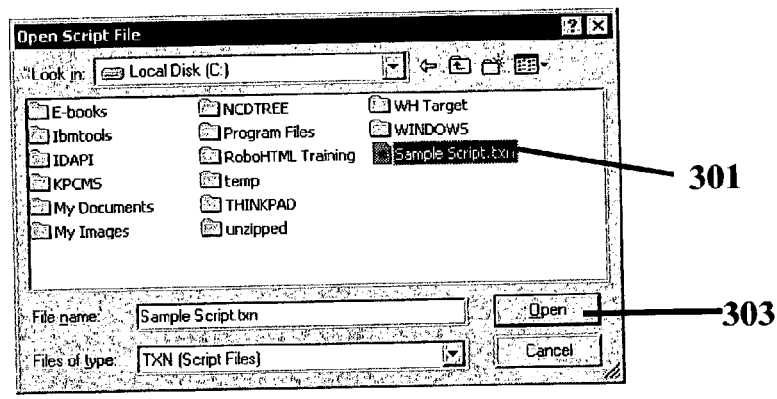
FIGS. 3-12 are portions of a displayed images.

A browse option is another way for the user to select their desired script file. Clicking on the browse field 207 launches the Open Script File dialog box 300 shown in FIG. 3. The user selects a script file (.txn) 301 to run and then selects Open 303.

Figure 4:
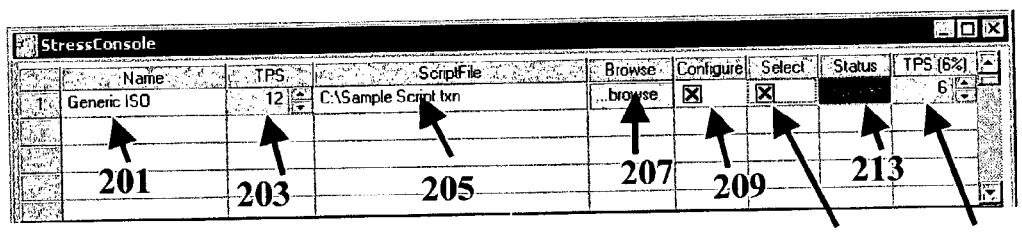

The script file name is then populated in script field 205 FIG. 2 and loaded internally to the processor 106 for the format specified FIG. 4.

Configure field or cell 209 is used to send configuration information to data generator computers 112, 114, 116, 118 from processor 106. When selected, an ☒ appears in the configure cell 209. If the configure cell 209 is not selected, the message format and script assigned to that data generator 112, 114, 116, 118 will not run.

The Select checkbox is used to determine which data generator computers 112, 114, 116, 118 will run or not run. When selected, an ☒ appears in the select cell 211. If the select cell 211 is not selected, the message format and script assigned to that data generator computer 112, 114, 116, 118 will not run.

Status field 213 indicates the current state of each data generator computer 112, 114, 116, 118. Status field 213 is dynamically populated when the user selects the Start 217, Stop 219 or Pause 221 buttons.

The message populated in status field 213 is one of the following actions:
Running—transactions are actively being exchanged;
Stopped—transaction exchanges have been stopped; or
Paused—transaction exchanges are paused.

Figure 5:
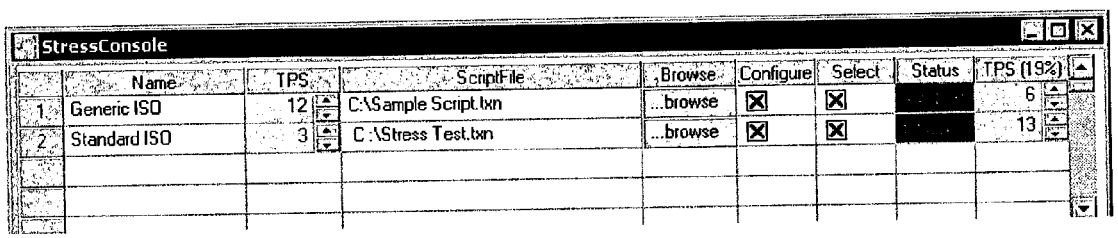

FIG. 5 illustrates how status field 213 shows the action selected.

The TPS Distribution field 215 displays the percentage of transactions each data generator computer 112, 114, 116, 118 generates in the overall format mix. For example, if the user configured two Standard ISO simulations and two NCR ATM simulations, with the percentage set to 25% for each data generator computer 112, 114, 116, 118 and the TPS knob 223 turned to 200 TPS, then the TPS rate on each data generator computer 112, 1114, 116, 118 gets set to 50 (25% of 200). If the percentage in TPS distribution field 215 is set to zero or a data generator compute 112, 114, 116, 118 is not selected, then the TPS rate will not change even if the TPS knob 223 is turned.

Control Panel 202 allows a user to control the actions involved with a testing session. The Start 217, Stop 219, and Pause 221 buttons control the flow of transactions.

Figures 6, 7:
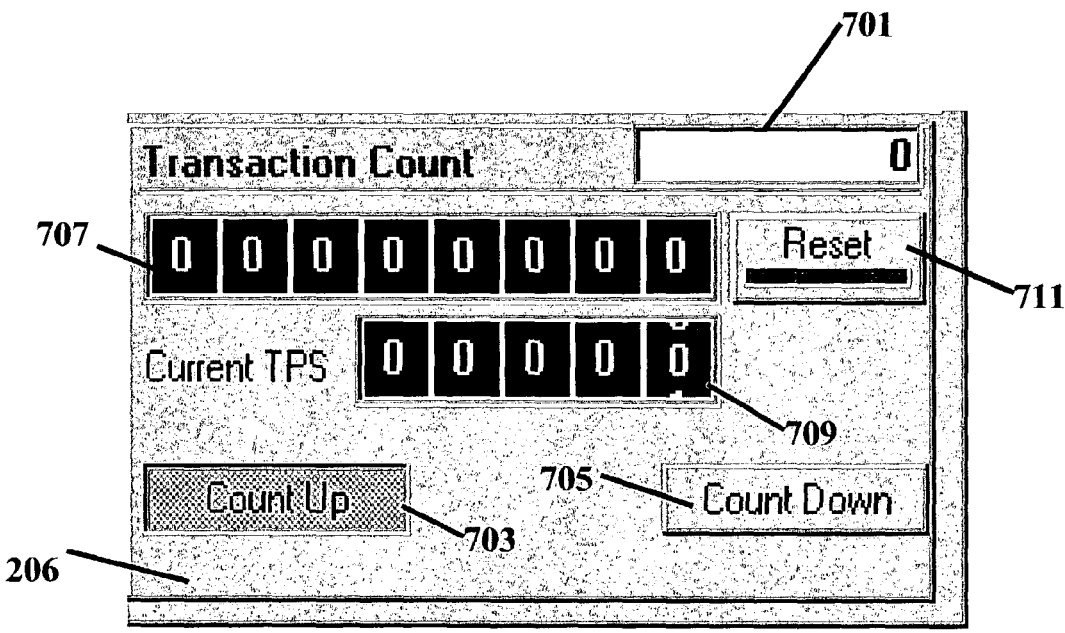

Log button 225 activates the transaction logging function to capture the specific transactions and fields for detailed review. Data is written to a .csv file that is accessible by Microsoft Access or other compatible applications. Included within this log are the precision timing field values used to calculate and report TPS rates and other calculations. A sample log file is shown in FIG. 6.

Returning to FIG. 2, the Configure All button 227 sends the configure command to all data generator computers 112, 114, 116, 118 listed. The Select All button 229 selects all the configured data generator computers 112, 114, 116, 118 from a list of available computers in the system configuration.

Graphs panel 231 enables a user to select or deselect the display of either or both or of response time and TPS graphs. Exit button 233 closes the application.

Flow control is a 'throttle-able' dial controlled by the user. To initiate the flow of transactions, the user selects the start button 217. The computer's mouse is used to control dial 223. The user clicks and holds the mouse on dot 223a. Moving dial 223 clockwise increases the transaction flow; moving counter-clockwise decreases the flow. Also the TPS can be increased or decreased by using Page Up and Page Down buttons on the keyboard, while the TPS button is selected.

The Save Settings button 235 enables a user to save the configuration settings (TPS, Script file and TPS %) displayed in the top grid. The data is stored in a file in memory 110.

The Use Prev Settings button 237 enables the user to retrieve previous settings from memory 110. This eliminates the need to set up the configuration parameters every time a user wants to run tests.

Through a Transaction Count dialog box 206, which is more clearly shown in FIG. 7, the progress of the overall transaction counts is also viewable. Transactions can either be set to count up from zero or count down from a number input by the user in an editable numeric box 701. The Count Up and Count Down buttons 703, 705 are used to select up and down count modes. The accumulated counts 707 are reset to zero by pressing the Reset button 711. The Current TPS 709 indicates the most current TPS as of last second, i.e. the TPS that was sent in the past one second between the system 100 and host system 101.

A Response Time Grid 208 is a real-time graphic display of the measurement of overall response times of the transaction exchanges measured in milliseconds against the Run Time of the testing session. Line 241 automatically adjusts as the rates vary from faster to slower and the grid adjusts the Response Time scale when necessary.

A Transaction Per Second (TPS) Grid 210 and the Current TPS odometer 709 display the most current TPS as of last second, i.e. the TPS that was sent in the past one second between the system 100 and host system 101. Line 243 automatically adjusts as the TPS rates are varied.

Figure 8:
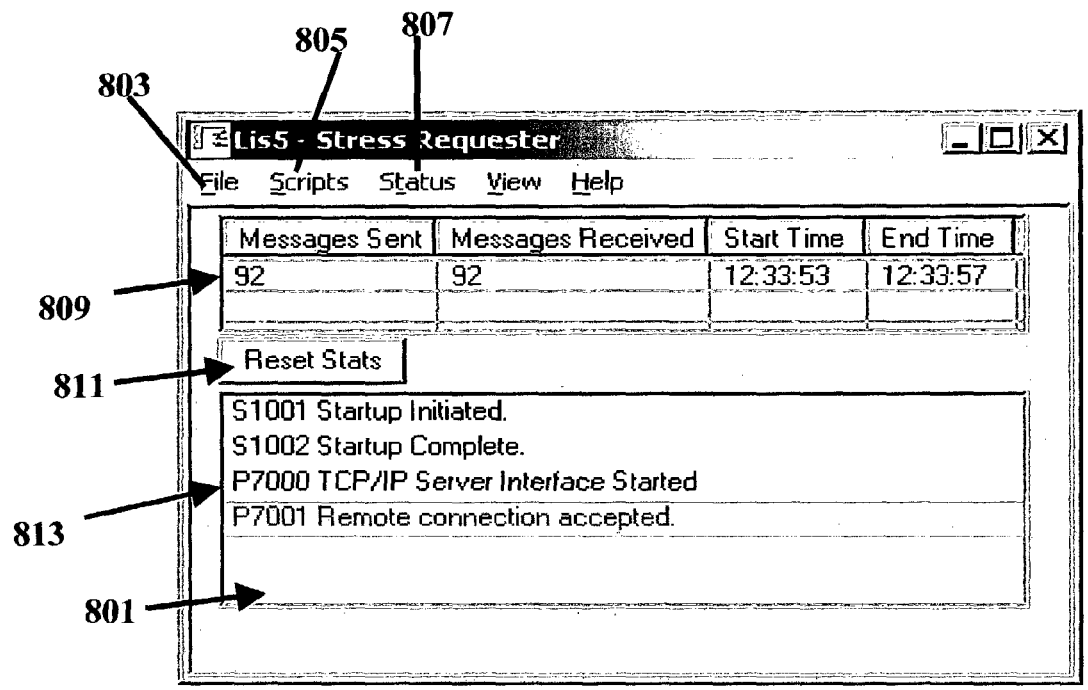

A message exchange simulator enables a user to view the sent count, received count, start and end times through the image display 801 shown in FIG. 8. It also enables to user to open trace files to view them. Multiple sessions of the exchange simulator can be run concurrently to provide a mix of various message formats at varying transaction rates.

Drop-down menus across the top of display 801 provide the user access to controls necessary to configure each specific data generator computer 112, 114, 116, 118 for script, trace, and other testing settings.

Figure 9:
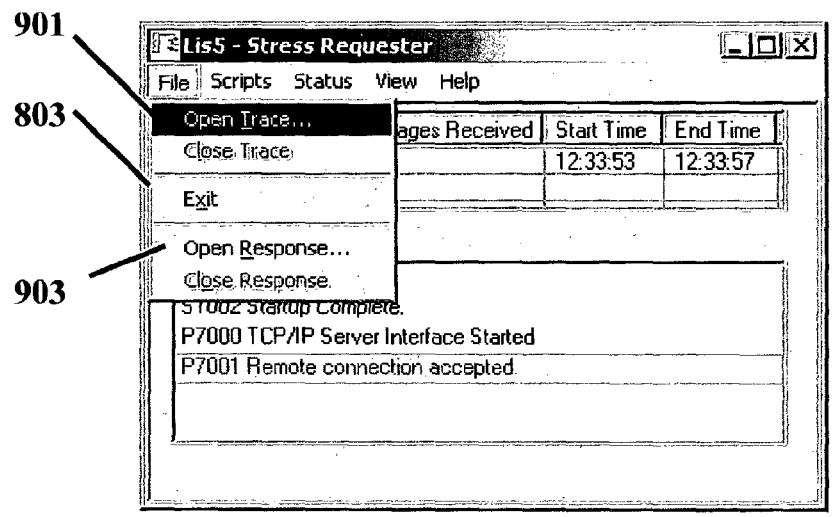

The File menu 803 contains the controls for opening and closing trace and response files. As shown in FIG. 9, the File menu 803 includes the Open Trace function 901 which if clicked on launches the Start a Trace File dialog box. The user then selects the desired trace file. A close trace selection closes the opened trace file. A message is written to the console notifying the user a trace file has been created. Selecting Exit from the file menu 803 closes and exits the application. Open Response 903 launches an Open Response File dialog box. The user then selects the desired response file. Selecting a Close Response closes the opened response file.

Figure 10:
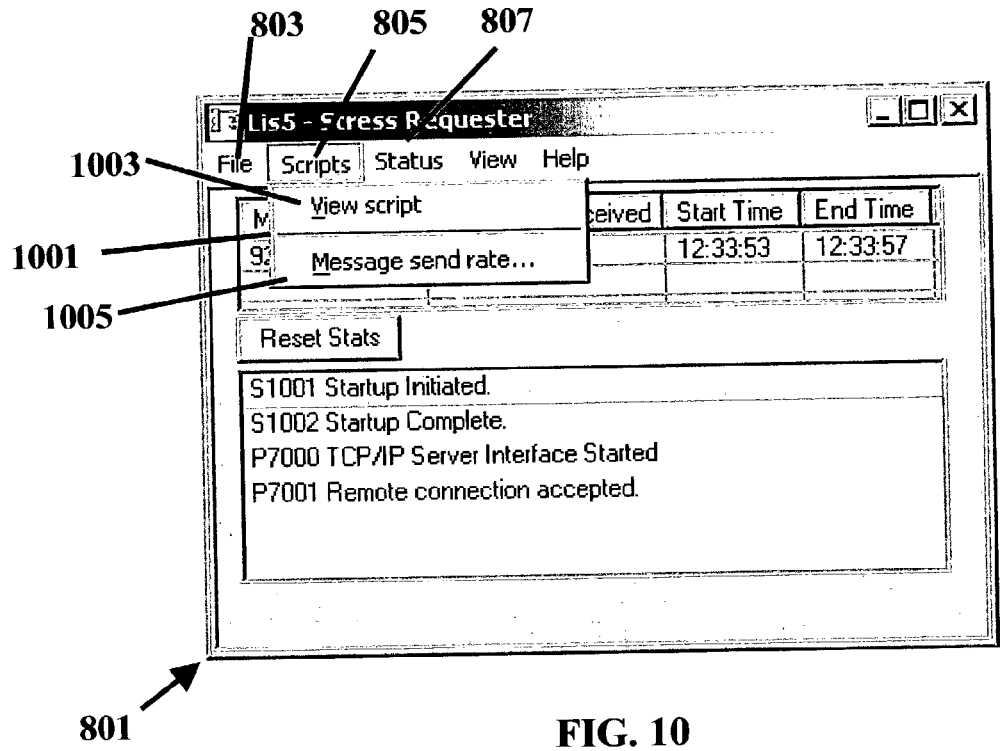
Figure 11:
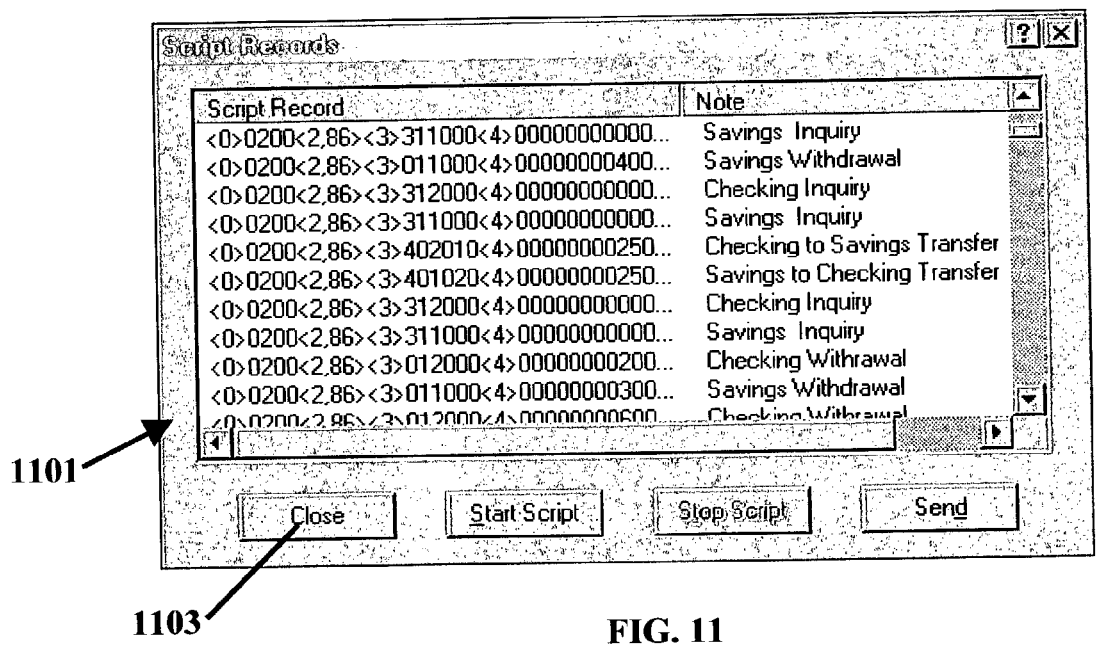

Selecting a Scripts menu 805 from display 801 drops down submenu 1001 shown in FIG. 10 for viewing the script file and Message send rate (TPS). Submenu 1001 allows a user to select View Script 1003 that enables the user to view abbreviated script records. Clicking on View Script 1003 causes the abbreviated script records image to be displayed as a dialog box 1101 shown in FIG. 11. The user may select a specific record to send or a specific starting point for the script to begin. By scrolling through the test script one or more scripts may be selected for sending. The Scripts menu is closed by selecting Close 1103.

By using submenu 1001, and clicking on Message Send Rate 1005, the TPS rate is displayed.

Figure 12:
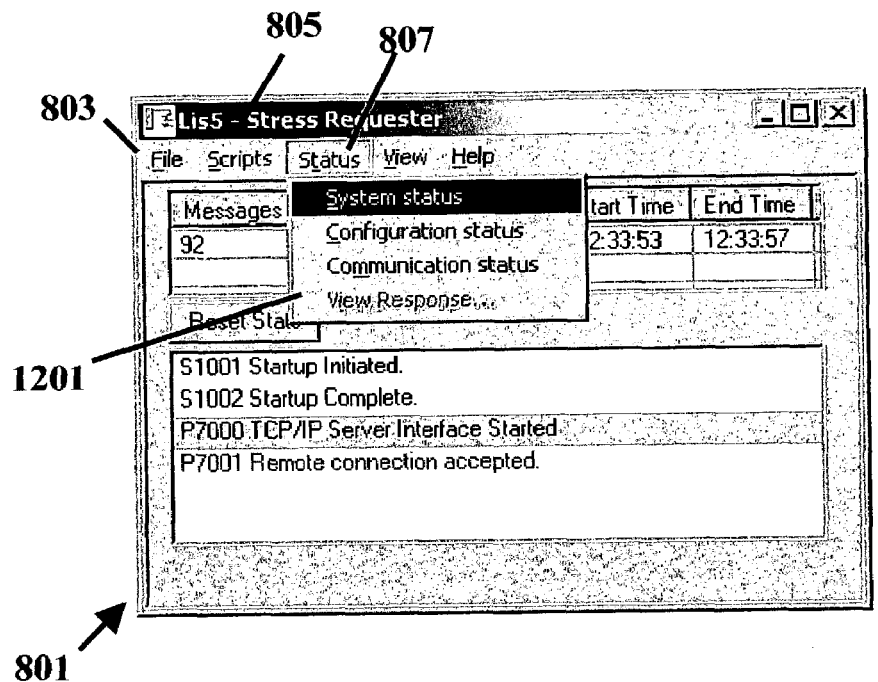

Selecting a Status menu 807 from display 801 drops down submenu 1201 shown in FIG. 12. Submenu 1201 is used to display the System status, the Configuration status, or the Communications status.

Turning back to FIG. 8, display 801 is comprised of two displays of transaction exchange information. The upper panel or portion 809 reports Messages Sent, Messages Received, Start Time and End Time for each testing session. Pressing the Reset Stats button 811 resets all statistics. The lower panel or portion 813 reports all system, configuration, communication, errors and transaction exchange information.

Figure 13:
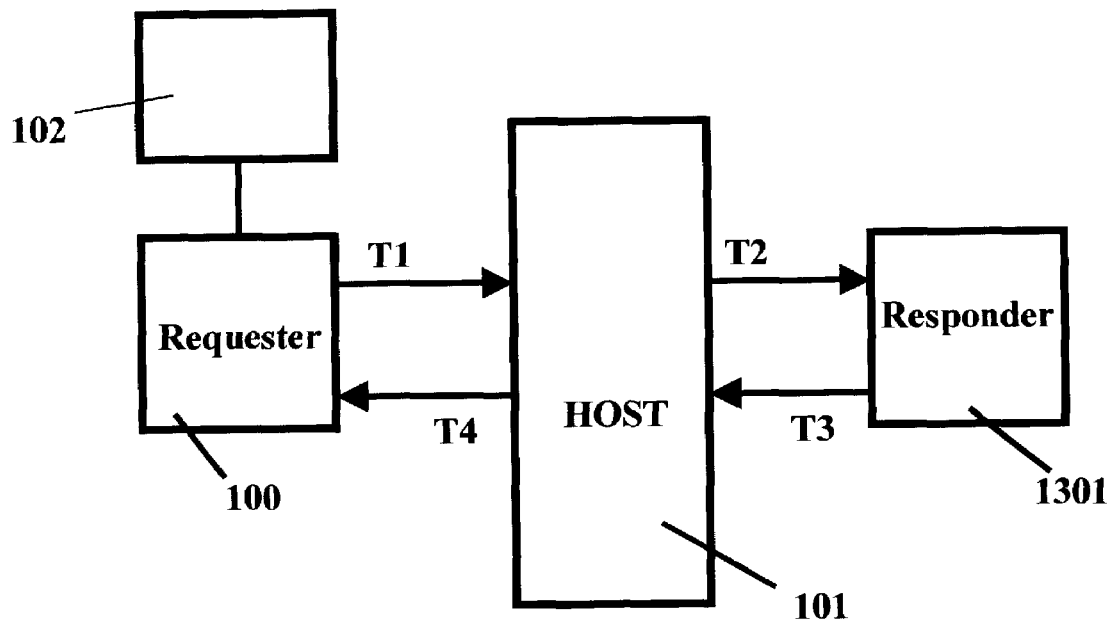
FIG. 13 is a block diagram of the system of the invention.

In accordance with one aspect of the invention, as shown in FIG. 13, one or more additional or third computers 1301 may be coupled to host system 101 to generate approved or declined transactions response information to host 101 in response to transaction requests to host 101 from data generator computers 103. Computer 102 incorporates full-message and field validation logic and dynamic error reporting. Computer 1301 includes memory 1303 that receives files downloaded from computer 102 to create custom-defined response messages.

The files downloaded to computer 1301 are generated by a responder program at computer 102. Computer 102 utilizes drop-down menus to provide the user access to controls necessary to configure each specific responder 1301 for response message control.

Computer 102 includes the test administrator and data generator application program, a transaction application program and a responder application program. In order for each application to communicate with one another and the Host system, certain configuration parameters must be setup before launching the applications. In the system configuration of the invention, multiple transaction requester computers 103 and multiple responder computers 133 may run at the same time to increase the volume and sources of transaction inputs. Because of this each individual data generator or transaction requester computer 103 and each responder computer 1301 must be loaded to a unique directory. This is controlled through an installation program at computer 102.

An automated launcher program tool manages the numerous transaction requester computers 103 and responder computers 1301 that must launch simultaneously to achieve the desired TPS. The user selects requester computers 103 to run, adds them to an activation list and starts all sessions.

The data generator computers 103 and responder computers 1301 communicate via TCPIP protocol. During installation of system 100 the user is prompted to select which component will run as a requester computers 103 or Clients and which serve as responder computers 1301 or server.

Computer 102 enables the user to create unique responses to request messages. It can be set up to send a particular response to a class of requests or to a specific request Computer 102 also includes a trace file. The trace file is a text file that records the details of every transaction that was sent and every transaction at came back. It includes everything seen on but in an easier to read format since it includes the field names. The trace file can be printed and passed around on paper or exported in a CSV format, for detailed examination. The trace file can be viewed on the display.

The invention has been described in terms of various embodiments. It is not intended that the invention be limited to the illustrative embodiments. It will be apparent to those skilled in the art that various modifications and changes may be made to the embodiments without departing from the spirit or scope of the invention. Accordingly, it is intended that the invention be limited only by the claims appended hereto.

What is claimed is:

1. A system for testing of electronic funds transfer (EFT) host system, comprising:
    a test administration and data generation first processor, said first processor being operable to generate predetermined scripts of EFT test messages for testing an EFT host system;

a predetermined number of second processors, each said second processor coupled to said first processor and each having one or more communication links to said host system; each said second processor receiving a selected script of said EFT test messages from said first processor; and said predetermined number of said second processors being determined by a maximum transactions rate of said system; and said first processor controlling operation of each of said second processors to cause each of said second processors to communicate corresponding test messages to said host system at corresponding transaction rates determined by said first processor.

2. A system in accordance with claim 1, comprising:
data generation and gathering software at each of said second processors for determining response time of said host system to receipt and processing of said EFT test messages.

3. A system in accordance with claim 1, comprising:
data collection and processing software at said first processor;
said first processor being operable in accordance with said data collection and processing software to obtain response time data from each of said second processors; and
said first processor being operable to generate a data record of response time of said host system to said EFT test messages.

4. A system in accordance with claim 3, comprising:
a control panel coupled to said first processor;
said control panel being usable to control said second processors to determine the rate of said test messages provided to said host system.

5. A system in accordance with claim 4, wherein:
said control panel is an electronic display produced by said first processor.

6. A system in accordance with claim 3, comprising:
a display coupled to said first processor, said display and said processor being operable to provide graphical images of the response time to said host system to said test messages.

7. A system in accordance with claim 6, wherein:
said display and said processor being operable to display the rate of test messages provided to said host system.

8. A system in accordance with claim 1, wherein:
said first processor is a personal computer.

9. A system in accordance with claim 8, wherein:
each of said second processors comprises a personal computer.

10. A system in accordance with claim 1, comprising:
a display coupled to said processor, said processor generating real time data
representative of the host system response time for processing said test messages and displaying said data on said display.

11. A system in accordance with claim 1, comprising:
one or more third processors, each coupled to said host system by one or more communication links to receive requests from said host system in response to certain ones of said test messages and to provide predetermined responses to said host for each test message.

12. A system in accordance with claim 11, comprising:
data generation and gathering software at each of said second processors for determining response time of said host system to receipt and processing of said EFT test messages and predetermined responses.

13. A system in accordance with claim 12, comprising:
data collection and processing software at said first processor;
said first processor being operable in accordance with said data collection and processing software to obtain response time data from each of said second and third processors; and
said first processor being operable to generate a data record of processing time of said host system to said EFT test messages and said predetermined responses.

14. A system in accordance with claim 13, comprising:
a control panel coupled to said first processor;
said control panel being usable to control said second processors to determine the rate of said test messages provided to said host system.

15. A system in accordance with claim 14, wherein:
said control panel is an electronic display produced by said first processor.

16. A system in accordance with claim 13, comprising:
a display coupled to said first processor, said display and said processor being operable to provide graphical images of the response time to said host system to said EFT test messages and predetermined responses.

17. A system in accordance with claim 16, wherein:
said display and said processor being operable to display the rate of test messages provided to said host system.

18. A system in accordance with claim 11, wherein:
said first processor is a personal computer.

19. A system in accordance with claim 18, wherein:
each of said second and third processors comprises a personal computer.

20. A method for testing of an electronic funds transfer (EFT) host system, comprising:
providing a test administration and data generation first processor;
operating said first processor to generate predetermined scripts of EFT test messages for said host system;
providing a predetermined number of second processors;
coupling each said second processor to said first processor;
coupling each said second processor via one or more communication links to said host system;
generating at said first processor selected scripts of EFT test messages;
transmitting to each said second processor receiving selected one of said script of said EFT test messages from said first processor;
determining said predetermined number of said second processors by a desired maximum transactions rate to be applied to said host system; and
operating said first processor to control operation of each of said second processors to cause each of said second processors to communicate corresponding test messages to said host system at corresponding transaction rates determined by said first processor.

21. A method in accordance with claim 20, comprising:
providing data generation and gathering software at each of said second processors for determining response time of said host system to receipt and processing of said EFT test messages.

22. A method in accordance with claim 20, comprising:
providing data collection and processing software at said first processor;
operating said first processor in accordance with said data collection and processing software to obtain response time data from each of said second processors; and utilizing said first processor to generate a data record of response time of said host system to said EFT test messages.

23. A method in accordance with claim 22, comprising:

providing a control panel coupled to said first processor; and using said control panel to control said second processors to determine the rate of said test messages provided to said host system.

24. A method in accordance with claim 23, wherein:

providing said control panel as an electronic display produced by said first processor.

25. A method in accordance with claim 22, comprising:

coupling a display to said first processor; and operating said display and said processor to provide graphical images of the response time to said host system to said test messages.

26. A method in accordance with claim 25, wherein:

operating said display and said processor to display the rate of test messages provided to said host system.

27. A method in accordance with claim 20, wherein:

providing a personal computer as said first processor.

28. A method in accordance with claim 20, wherein:

providing a personal computer for each of said second processors.

29. A method in accordance with claim 20, comprising:

a display coupled to said processor, said processor generating real time data representative of the host system response time for processing said test messages and displaying said data on said display.

30. A method in accordance with claim 20, comprising:

providing one or more third processors;

coupling each of said one or more third processors to said host system by one or more communication links;

utilizing each of said one or more third processors for receiving requests from said host system in response to certain ones of said test messages and for providing predetermined responses to said host for each test message.

31. A method in accordance with claim 30, comprising:

providing data generation and gathering software at each of said second processors for determining response time of said host system to receipt and processing of said EFT test messages and predetermined responses.

32. A method in accordance with claim 31, comprising:

providing data collection and processing software at said first processor;

operating said first processor in accordance with said data collection and processing software for obtaining response time data from each of said second and third processors; and operating said first processor for generating a data record of processing time of said host system to said EFT test messages and said predetermined responses.

33. A method in accordance with claim 32, comprising:

providing a control panel coupled to said first processor; and utilizing said control panel being to control said second processors to determine the rate of said test messages provided to said host system.

34. A method in accordance with claim 33, wherein:

utilizing an electronic display to display a control panel produced by said first processor.

35. A method in accordance with claim 32, comprising:

providing a display coupled to said first processor; and operating said display and said processor to provide graphical images of the response time to said host system to said EFT test messages and predetermined responses.

36. A method in accordance with claim 35, wherein:

operating said display and said processor to display the rate of test messages provided to said host system.

37. A method in accordance with claim 30, wherein:

providing a personal computer as said first processor.

38. A method in accordance with claim 37, wherein:

providing personal computers for each of said second and third processors.

* * * * *